United States Patent [19]
Takahashi

[11] Patent Number: 5,967,282
[45] Date of Patent: Oct. 19, 1999

[54] ELECTROMAGNETIC COUPLING DEVICE

[75] Inventor: Toshio Takahashi, Kiryu, Japan

[73] Assignee: Ogura Clutch Company, Ltd., Gunma, Japan

[21] Appl. No.: 08/959,411

[22] Filed: Oct. 28, 1997

[30] Foreign Application Priority Data

Dec. 16, 1996 [JP] Japan .................................. 8-353279
Feb. 27, 1997 [JP] Japan .................................. 9-059812

[51] Int. Cl.⁶ .............................. F16D 27/112; H01F 5/04
[52] U.S. Cl. ...................................... 192/84.961; 335/296
[58] Field of Search ...................... 192/84.961; 335/289, 335/296

[56] References Cited

U.S. PATENT DOCUMENTS

| | | | |
|---|---|---|---|
| 4,432,446 | 2/1984 | Okano et al. ............................. | 192/84 |
| 4,935,713 | 6/1990 | Bekheet .................................. | 335/296 |
| 5,138,293 | 8/1992 | Ishimaru ................................. | 335/289 |
| 5,307,038 | 4/1994 | Ishimaru ................................. | 335/296 |
| 5,320,206 | 6/1994 | Maejima ................................. | 192/84 |
| 5,508,671 | 4/1996 | Takashi .................................. | 335/296 |
| 5,687,823 | 11/1997 | Nakagawa et al. ................. | 192/84.961 |
| 5,812,044 | 9/1998 | Sakamoto ............................ | 335/289 X |

FOREIGN PATENT DOCUMENTS

| | | |
|---|---|---|
| 0741254A2 | 11/1996 | European Pat. Off. . |
| 0806583A1 | 11/1997 | European Pat. Off. . |
| 19611956A1 | 3/1996 | Germany . |
| 4-125321 | 4/1992 | Japan . |
| 7-127662 | 5/1995 | Japan . |
| 7-127663 | 5/1995 | Japan . |

OTHER PUBLICATIONS 97 30 8795 European Search Report—Feb. 2, 1998.

*Primary Examiner*—Rodney H. Bonck
*Attorney, Agent, or Firm*—Sidley & Austin; Hugh A. Abrams

[57] ABSTRACT

A terminal engagement-insertion portion for an electromagnetic coupling device to be inserted into the through hole of a yoke is provided with two terminal holding portions and each of which has a coil engagement-insertion groove and a terminal engagement-insertion hole. In addition, an insertion portion to insert the guide portion of a terminal housing thereinto is defined between the terminal holding portions. While the guide portion is being inserted into the insertion portion, the terminals are electrically connected with the ends of an exciting coil, respectively.

11 Claims, 16 Drawing Sheets

ELECTROMAGNETIC COUPLING DEVICE

BACKGROUND OF THE INVENTION

This invention relates to an electromagnetic coupling device comprising a yoke assembly in which the ends of an exciting coil are electrically connected to the terminals of a connector held by a yoke.

An electromagnetic coupling device in the prior art, particularly an electromagnetic clutch which is installed on the compressor of an air conditioning system for an automobile and which is used as a power transmission device, has a structure wherein the terminal housing of a coil side connector, connected with a power source side connector, is held by a yoke and wherein a pair of terminals embedded in the terminal housing are electrically connected to the ends of an exciting coil.

The yoke assembly of an electromagnetic clutch proposed in the official gazettes of Japanese Patent Applications Laid-open No. 127662/1995 and No. 127663/1995 (hereinbelow, termed the "preceding invention") comprises a yoke including a coil bobbin around which an exciting coil coated with an insulating film is wound, an annular groove in which the coil bobbin is snugly fitted, and through holes into which projections provided on a flange lying on one side of the coil bobbin are inserted; a pair of terminals which are inserted from outside into the through holes of the yoke and whose distal ends are pressedly fitted on the projections of the coil bobbin; caulking pieces with which the respective terminals are integrally formed and to which the initial winding end and terminal winding end of the exciting coil are respectively fixed by caulking; a casting resin which is poured into the annular groove of the yoke so as to insulate the exciting coil from the exterior; and the terminal housing of a coil side connector which is formed of the casting resin. Incidentally, the bent caulking pieces of the terminals and the corresponding ends of the exciting coil are electrically connected in such a way that the coating film of the exciting coil is perfectly torn off owing to heat generated by the exciting coil energized.

In addition, a diode package which functions as a surge voltage absorbing device is assembled in the terminal housing of the yoke assembly. The diode package is constructed as a separate component lest a diode should damage under heat and pressure when the terminal housing is molded with the casting resin. Further, the diode package has a structure including a concavity in which the case of the diode is accommodated, a pair of through holes into which the pair of terminals are individually inserted, and a guide portion which is extended outside and which is engaged with a recess formed in the terminal housing of a power source side connector. Herein, the pair of leads of the diode are individually projected into the through holes. In addition, while the respective terminals are being inserted into the through holes of the diode package, this diode package is snugly fitted into the terminal housing, whereby the respective terminals and the corresponding leads of the diode are electrically connected.

With the yoke assembly of the preceding invention, the terminal housing is integrally molded using the casting resin of the exciting coil, and hence, the pair of terminals are previously fixed to the projections formed on the flange of the coil bobbin. Besides, the initial winding end and terminal winding end of the exciting coil are led out of the through holes of the yoke, and the caulking pieces of the respective terminals disposed outside the yoke are caulked, thereby to electrically connect the ends of the exciting coil and the terminals. In the electromagnetic clutch which is installed on the compressor, the yoke assembly is constructed between a rotor, which is supported through a bearing around a cylindrical portion provided on the front housing of the compressor, and the side surface of the front housing of the compressor. Accordingly, the development of a yoke assembly in which the quantity of protrusion of the terminal housing is small is desired in order that the full length dimension of the compressor on which the electromagnetic clutch is installed may be prevented from enlarging.

Accordingly, one object of this invention is to provide an electromagnetic coupling device comprising a yoke assembly in which the quantity of protrusion of a terminal housing is small. Additional objects of this invention will be apparent from the discussion below.

SUMMARY OF THE INVENTION

The present invention is directed to an electromagnetic coupling device, such as a device suitable for installation onto a compressor. A terminal engagement-insertion portion, to be inserted into the through hole of a yoke, is provided with two terminal holding portions, each of which has a coil engagement-insertion groove and a terminal engagement-insertion hole. An insertion portion, to insert the guide portion of a terminal housing thereinto, is defined between the terminal holding portions. While the guide portion is being inserted into the insertion portion, the terminals are electrically connected with the ends of an exciting coil, respectively.

According to the electromagnetic coupling device of one embodiment of this invention, the ends of an exciting coil and end terminals are electrically connected in the terminal engagement-insertion portion of a coil bobbin inserted into the through hole of a yoke, so that the quantity of protrusion of a terminal housing from the yoke can be made small.

Accordingly, the full length dimension of a compressor on which the electromagnetic coupling device is installed can be shortened. Moreover, according to the electromagnetic coupling device of this invention, the end terminals and the ends of the exciting coil are electrically connected while a guide portion provided on the terminal housing is being inserted into an insertion portion formed in the terminal engagement-insertion portion of the coil bobbin, so that such a connecting operation can be reliably performed to prevent an inferior connection and the like problems on the quality of the coupling device. In addition, in another embodiment of this invention, the minus side end of an exciting coil is earth-connected to a yoke, so that only a single lead is needed for a power source side connector, and the electromagnetic coupling device of lower cost can be offered.

According to another embodiment of this invention, a surge voltage absorbing member is embedded in a terminal housing prepared as a component, not in the terminal housing of an exciting coil formed of a casting resin, so that the surge voltage absorbing member is not damaged by heat or pressure during insert-molding. Moreover, waterproofness for the surge voltage absorbing member is excellent.

According to the electromagnetic coupling device of another embodiment of this invention, an exciting coil held by a coil bobbin can be insulated from the exterior by a coil cover formed with a terminal engagement-insertion portion into which intermediate terminals are inserted in engagement, and a casting resin need not be poured into a yoke, so that the productivity of the electromagnetic coupling device is enhanced.

According to the electromagnetic coupling device of another embodiment of this invention, each of the internal connection portion and mediate connection portion of each end terminal is provided with opposing side plate portions, and each of the side plate portions is formed with individual engagement-insertion grooves, so that the ends of an exciting coil or the leads of a surge voltage absorbing member can be readily connected to the respective connection portions.

According to the electromagnetic coupling device of another embodiment of this invention, the terminal engagement-insertion portion of a coil cover is provided with terminal holding portions each of which includes a coil engagement-insertion groove, a lead engagement-insertion groove and a terminal engagement-insertion hole, and this terminal engagement-insertion portion is closed up with a cover member, so that the connection between an exciting coil and a thermosensitive member can be facilitated to enhance the productivity of the electromagnetic coupling device. Moreover, waterproofness within the terminal engagement-insertion portion is excellent.

According to the electromagnetic coupling device of another embodiment of this invention, each of intermediate terminals is provided with opposing side plate portions, and the side plate portions are individually formed with engagement-insertion grooves, so that the cut ends of an exciting coil and the leads of a thermosensitive member can be readily connected.

For a better understanding of these and other aspects and objects of the invention, reference should be made to the following detailed description taken in conjunction with the accompanying drawings.

BRIEF DESCRIPTION OF THE DRAWINGS

In the drawings, which are not to scale,

FIG. 8(a) is a sectional view of the coil bobbin as taken along a line D—D in FIG. 6, while

DETAILED DESCRIPTION OF THE PREFERRED EMBODIMENTS

Figure 1:
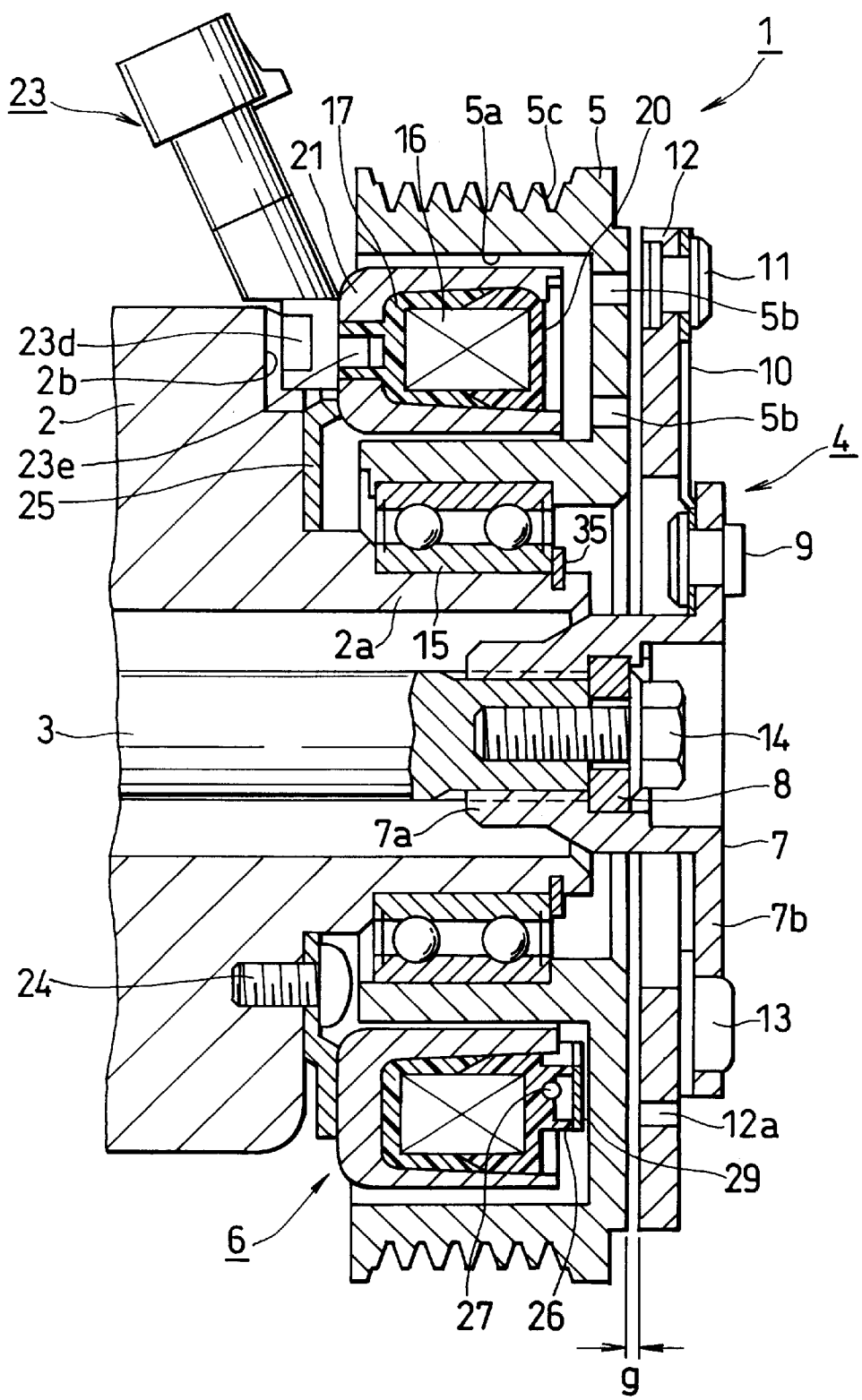
FIG. 1 is a sectional view of an electromagnetic clutch illustrated as one aspect of this invention.

The present invention is directed to an electromagnetic coupling device applicable to an electromagnetic clutch for power transmission. Preferably, the electromagnetic clutch is installed onto a compressor, such as the compressor of an air conditioning system for an automobile. However, the electromagnetic coupling device of the present invention is also suitable for use in other industries.

Turning now to the drawings, an electromagnetic clutch 1 shown in these drawings comprises an armature assembly 4 which is mounted on the front housing 2 of a compressor and which is fixed to the shaft end of the rotary shaft 3 of the compressor, a rotor 5 which is rotatably supported around a cylindrical portion 2a integrally formed on the front housing 2, and a yoke assembly 6 which is inserted in the annular groove 5a of the rotor 5 and which is fixed to the front housing 2.

The armature assembly 4 includes an armature hub 7 which has a boss portion 7a fitted on the shaft end of the rotary shaft 3 through splines and a flange portion 7b formed in a substantially triangular shape as viewed from the front of the electromagnetic clutch 1 (the right side of FIG. 1), a patch 8 which is fixed to the end face of the boss portion 7a of the armature hub 7, a plurality of (usually, three) leaf springs 10 which are formed in a ring shape and each of which has its base end part fixed to the flange portion 7b by a rivet 9, and an armature 12 to which the free end parts of the leaf springs 10 are respectively fixed by rivets 11. Besides, owing to the resilient restoring forces of the leaf springs 10, the armature 12 abuts against stopper rubber 13 which is fixed to the flange portion 7b. In this structure, a bolt 14 is inserted through the center hole of the pad 8 and is threadably engaged with the tapped hole of the rotary shaft 3, whereby the armature assembly 4 is fixed to the rotary shaft 3, and the friction surface of the armature 12 is opposed to that of the rotor 5 with a predetermined gap g held therebetween. By the way, symbol 12a denotes a slot of circular arc shape which is formed in the armature 12.

The rotor S includes the annular groove 5a into which the yoke assembly 6 is inserted, outer and inner slots of circular arc shape 5b which are respectively provided in the disc-like part of this rotor 5 formed with the friction surface, and a pulley groove 5c which is formed in the outer peripheral surface of this rotor 5 by a rolling work. In addition, the rotor 5 is rotatably supported around the cylindrical portion 2a of the front housing 2 by a bearing 15 which is fitted on this cylindrical portion 2a and which is prevented from coming off by a snap ring 35. Herein, the magnetic flux of the yoke assembly 6 inserted in the annular groove 5a is circumvented by the slots 5b of the rotor 5 and the slot 12a of the armature 12, whereupon it flows into the rotor 5 and the armature 12.

The yoke assembly 6 includes the following constituents: An exciting coil 16 is made of selffusion wire which is annularly wound. A coil bobbin 17 has a first coil holding portion 18 in which substantially one half of the exciting coil 16 is fitted, while a coil cover 20 has a second coil holding portion 19 in which substantially the other half of the exciting coil 16 is fitted. A yoke 21 has an annular groove 21a in which the coil bobbin 17 and the coil cover 20 are snugly fitted, and a through hole 21b in which the first terminal engagement-insertion portion 22 of the coil bobbin 17 is inserted. A coil side connector 23 is disposed at the rear of the yoke 21. A mounting plate 25 has a pair of raise pieces 25a which hold the connector 23 on the yoke 21, and positioning convexities 25b which are snugly fitted in the concavities (not shown) of the front housing 2. The mounting plate 25 is welded to the rear surface of the yoke 21, and is fixed to the front housing 2 by a screw 24.

As shown in FIGS. 4 thru 8(b), the annular coil bobbin 17 made of a synthetic resin material is formed with an annular groove 18a in which substantially one half of the exciting coil 16 is fitted. This coil bobbin 17 is provided with the first coil holding portion 18 which is open in the direction of the center line of the electromagnetic clutch 1, and the first terminal engagement-insertion portion of box shape 22 which is open in a sense opposite to that of the coil holding portion 18 in the above direction of the center line. The open end face 18b of the coil holding portion 18 is formed into an inclined plane.

Formed at the bottom of the annular groove 18a is a stepped portion 18c which serves to lead out the initial winding end 16a of the exciting coil 16, a stepped portion 18d which serves to lead out the terminal winding end 16b of the exciting coil 16, and a pair of coil leading-out ports 18e which are respectively formed in the stepped portions 18c and 18d and which are spaced from each other in the circumferential direction of the coil bobbin 17.

The first terminal engagement-insertion portion 22 of the coil bobbin 17 is extended from one coil leading-out port 18e toward the other coil leading-out port 18e. This portion 22 is formed with a pair of coil engagement-insertion grooves 18f into which the ends 16a and 16b of the exciting coil 16 led out of the coil leading-out ports 18e are inserted in engagement, and a pair of terminal engagement-insertion holes 18h, each of which is provided at the intermediate part of the corresponding coil engagement-insertion groove 18f, and is formed with terminal engagement-insertion grooves 18g at its four corners. The coil engagement-insertion grooves 18f and the terminal engagement-insertion holes 18h constitute two terminal holding portions 18A and 18B in a pair.

Defined between the terminal holding portions 18A and 18B is an insertion portion 18i into which a guide portion of prism shape 23e, formed on the terminal housing 23a of the connector 23, is inserted. Incidentally, symbols 18j denote pedestals which are respectively formed at the bottoms of the terminal engagement-insertion holes 18h and on which the ends 16a and 16b of the exciting coil 16 are respectively placed.

Figure 13:
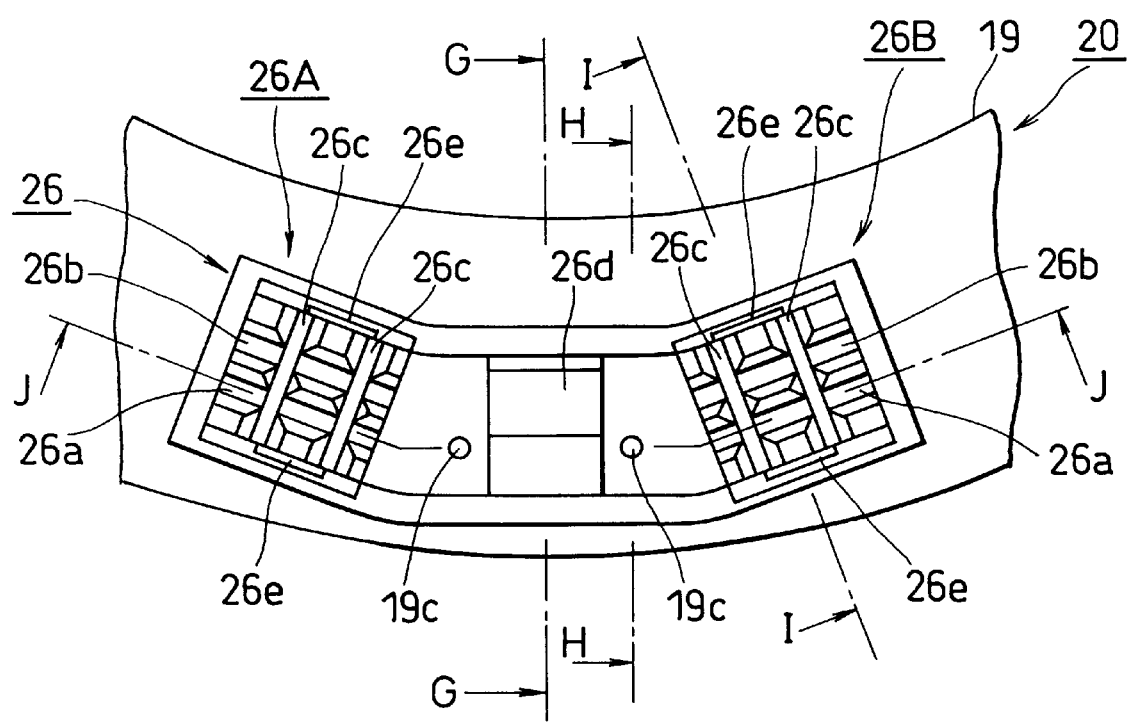
FIG. 13 is a rear view of the coil cover showing the surroundings of the terminal engagement-insertion portion.
Figure 14A:
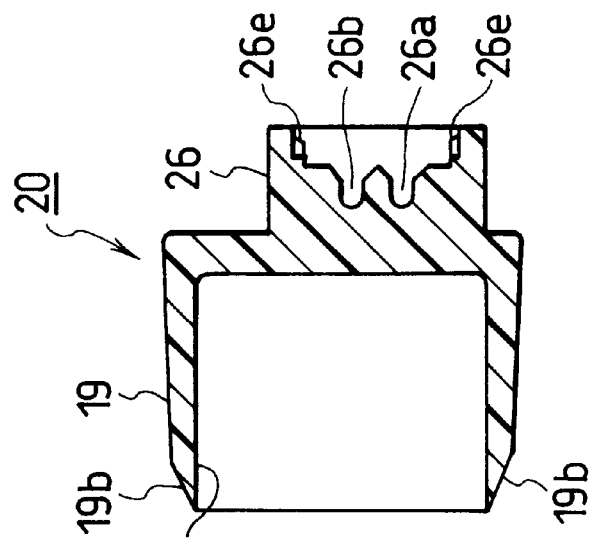
FIGS. 14(a), 14(b) and 14(c) are sectional views of the coil cover as taken along a line G—G, a line H—H and a line I—I in FIG. 13, respectively.
Figure 14B:
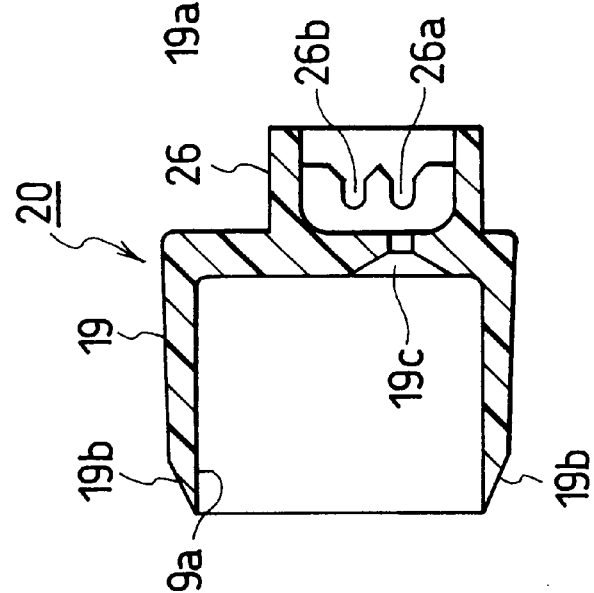
Figure 14C:
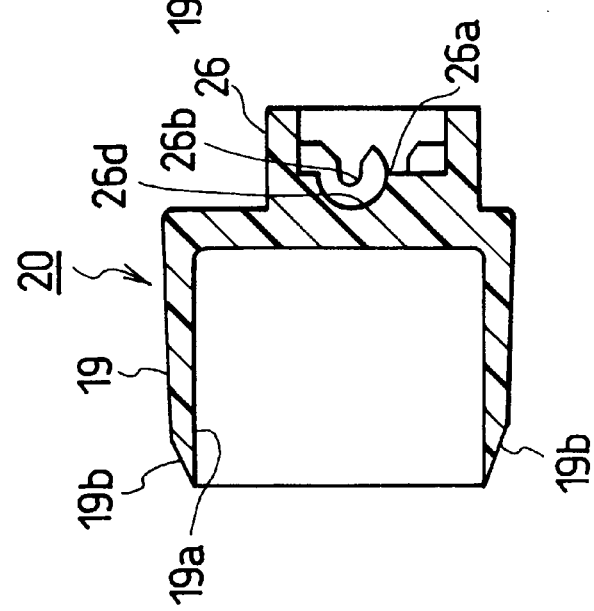
Figure 15:
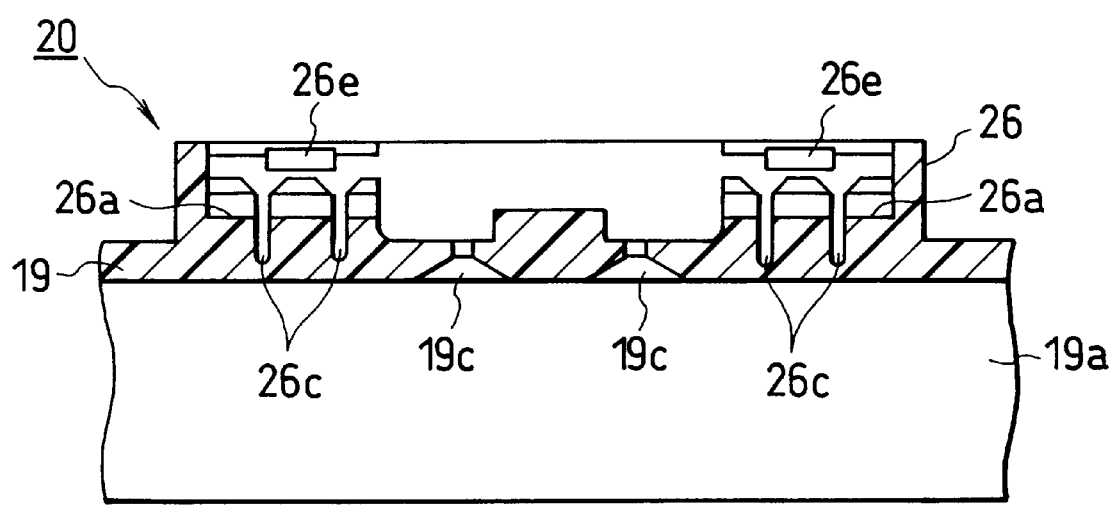
FIG. 15 is a developed sectional view taken along a line J—J in FIG. 13.

The inclined open end face 19b of the coil cover 20 is closely joined to the open end face 18b of the coil bobbin 17 in a one-over-the other configuration. As shown in FIGS. 13 thru 15, the annular coil cover 20, made of a synthetic resin material, is formed with an annular groove 19a in which substantially one half of the exciting coil 16 is fitted. This coil cover 20 is provided with the second coil holding portion 19 which is open in the direction of the center line of the electromagnetic clutch 1, and a second terminal engagement-insertion portion 26 which is open in a sense opposite to that of the coil holding portion 19 in the above direction of the center line. Formed at the bottom of the annular groove 19a are a pair of coil leading-out ports 19c which serve to lead out the pair of cut ends 16c of the exciting coil 16 to the side of the terminal engagement-insertion portion 26.

Incidentally, the center line of the coil bobbin 17 and that of the coil cover 20 agree with the center line of the rotary shaft 3, respectively. In addition, the second terminal engagement-insertion portion 26 is disposed at a position which shifts 180° from the first terminal engagement-insertion portion 22 in the circumferential direction of the electromagnetic clutch 1, and it is in the shape of a box whose right and left sides are bent toward the center of the coil cover 20.

The second terminal engagement-insertion portion 26 of the coil cover 20 is formed with a pair of coil engagement-insertion grooves 26a into which the respective cut ends 16c of the exciting coil 16 led out of the coil leading-out ports 19c are inserted in engagement, and a pair of lead engagement-insertion grooves 26b into which the respective leads 27a of a temperature fuse (a thermally-reactive switch such as bimetal, or the like) 27 functioning as a thermosensitive member are inserted in engagement. The coil engagement-insertion grooves 26a and the lead engagement-insertion grooves 26b are spaced from each other in the circumferential direction of the coil cover 20, and are individually formed in two terminal holding portions 26A and 26B into which intermediate terminals 28 are inserted in engagement. The coil engagement-insertion groove 26a and the lead engagement-insertion groove 26b of each of the terminal holding portions 26A and 26B are formed in parallel at a spacing in the radial direction of the coil cover 20. Besides, a pair of terminal engagement-insertion grooves 26c are individually formed in each of the terminal holding portions 26A and 26B so as to cut off the coil engagement-insertion groove 26a and the lead engagement-insertion groove 26b. Further, a semicylindrical pedestal 26d on which the cylindrical case 27b of the temperature fuse 27 is put is formed between the terminal holding portions 26A and 26B. Incidentally, unshown projections formed on a cover 29 are fitted in concavities denoted by symbols 26e.

Next, there will be described the assemblage of a coil assembly including the coil bobbin 17, coil cover 20 and exciting coil 16 as stated above. In assembling the coil assembly, the self-fusion wire to make up the exciting coil 16 is first wound into a predetermined number of turns by a winding machine. Thereafter, the whole resulting structure except the initial winding end 16a, terminal winding end 16b and cut ends 16c is subjected to such bonding processing within the exciting coil 16 as heating and alcoholization until the exciting coil 16 is hardened into a hollow cylindrical shape. Subsequently, while the initial winding end 16a and terminal winding end 16b are being led out from the coil leading-out ports 18e to the side of the terminal engagement-insertion portion 22, substantially one half of the exciting coil 16 is fitted into the coil holding portion 18 of the coil bobbin 17. Subsequently, while the cut ends 16c are being led out from the coil leading-out ports 19c to the side of the terminal engagement-insertion portion 26, the coil cover 20 is put on substantially the other half of the exciting coil 16. Herein, the open end face 18b of the coil bobbin 17 and that 19b of the coil cover 20 are placed one over the other. Incidentally, the open end faces 18b and 19b placed one over the other are sometimes bonded over their whole circumferences by ultrasonic welding.

Figure 2:
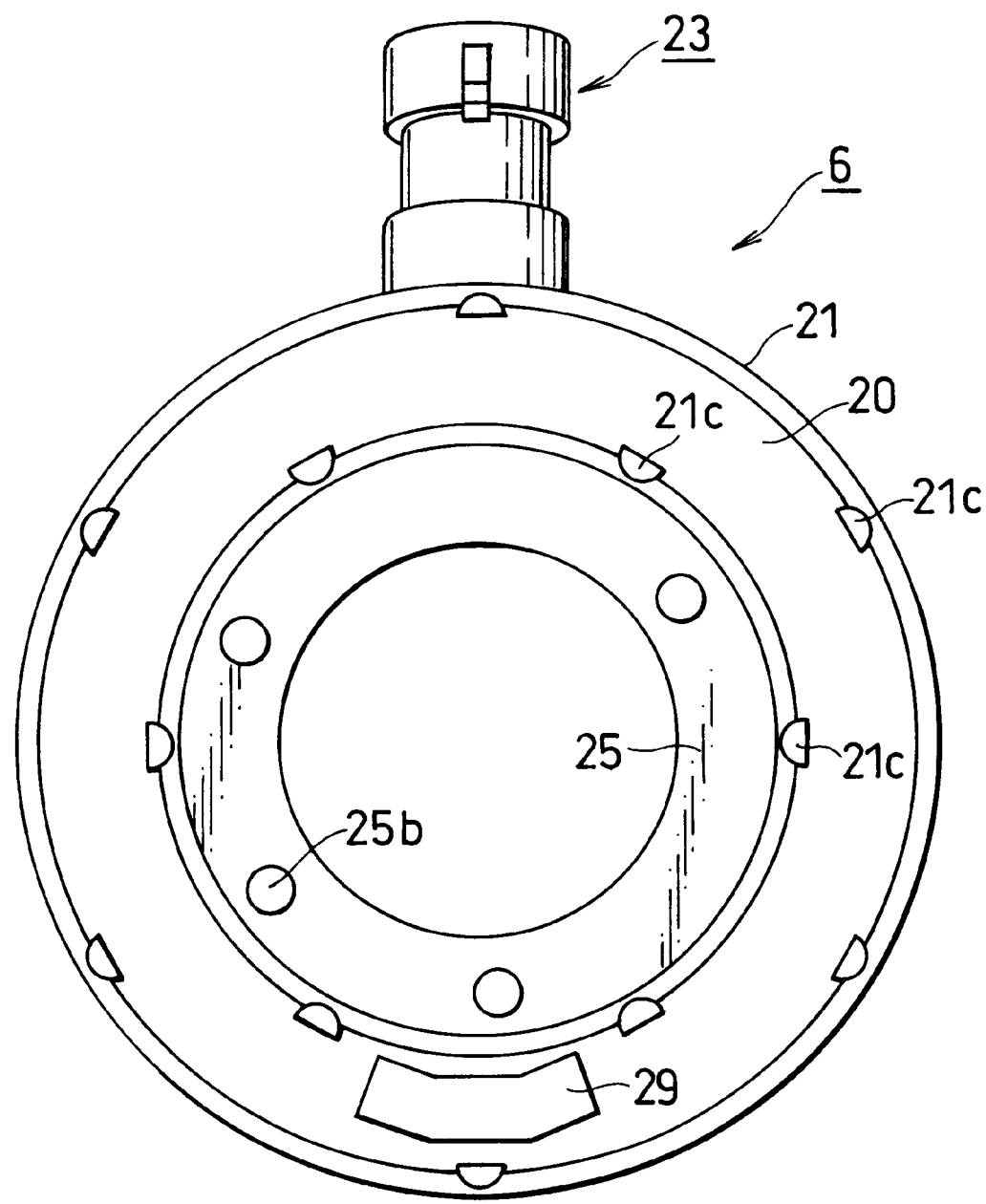
FIG. 2 is a front view of a yoke assembly.
Figure 3:
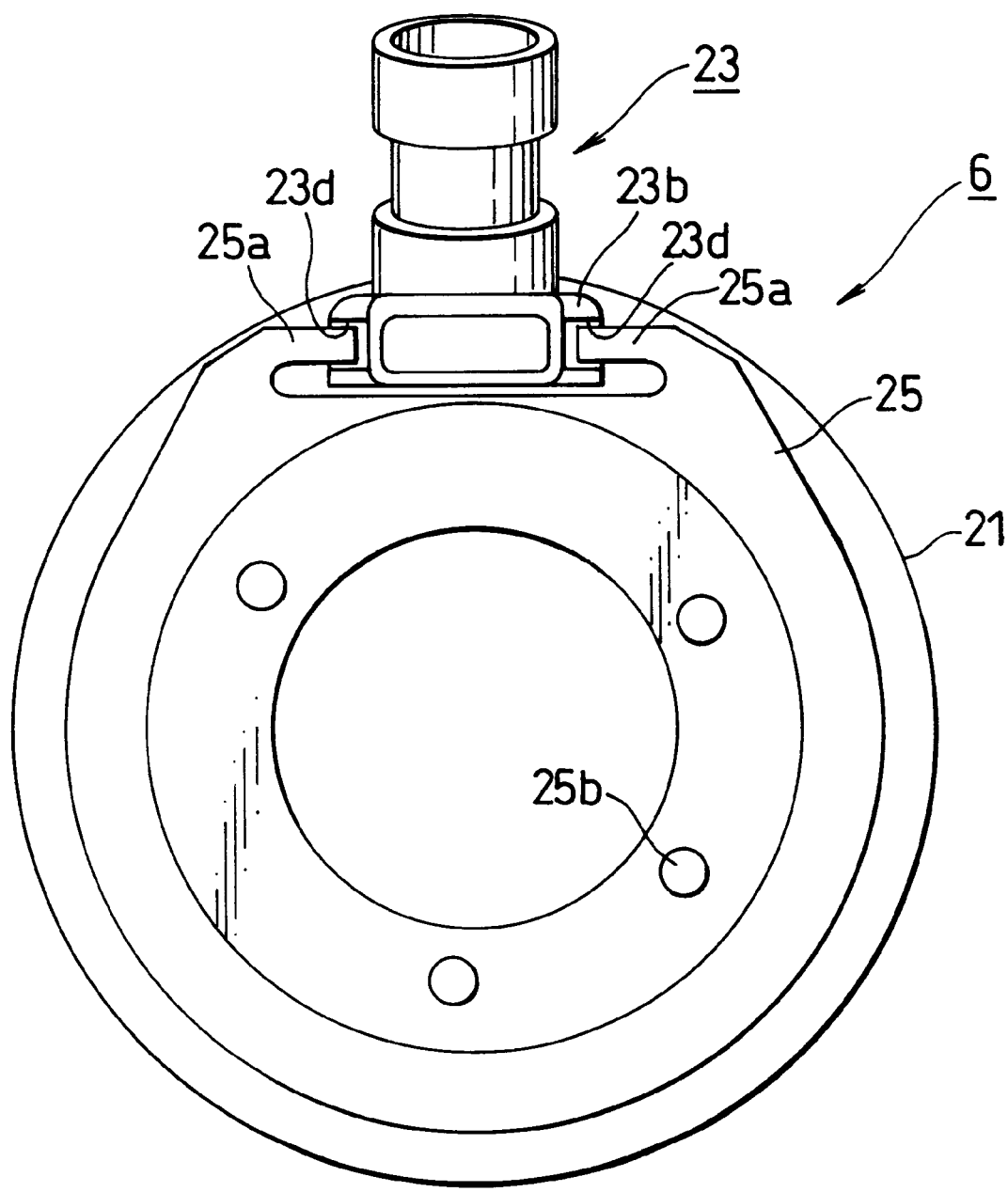
FIG. 3 is a rear view of the yoke assembly.
Figure 4:
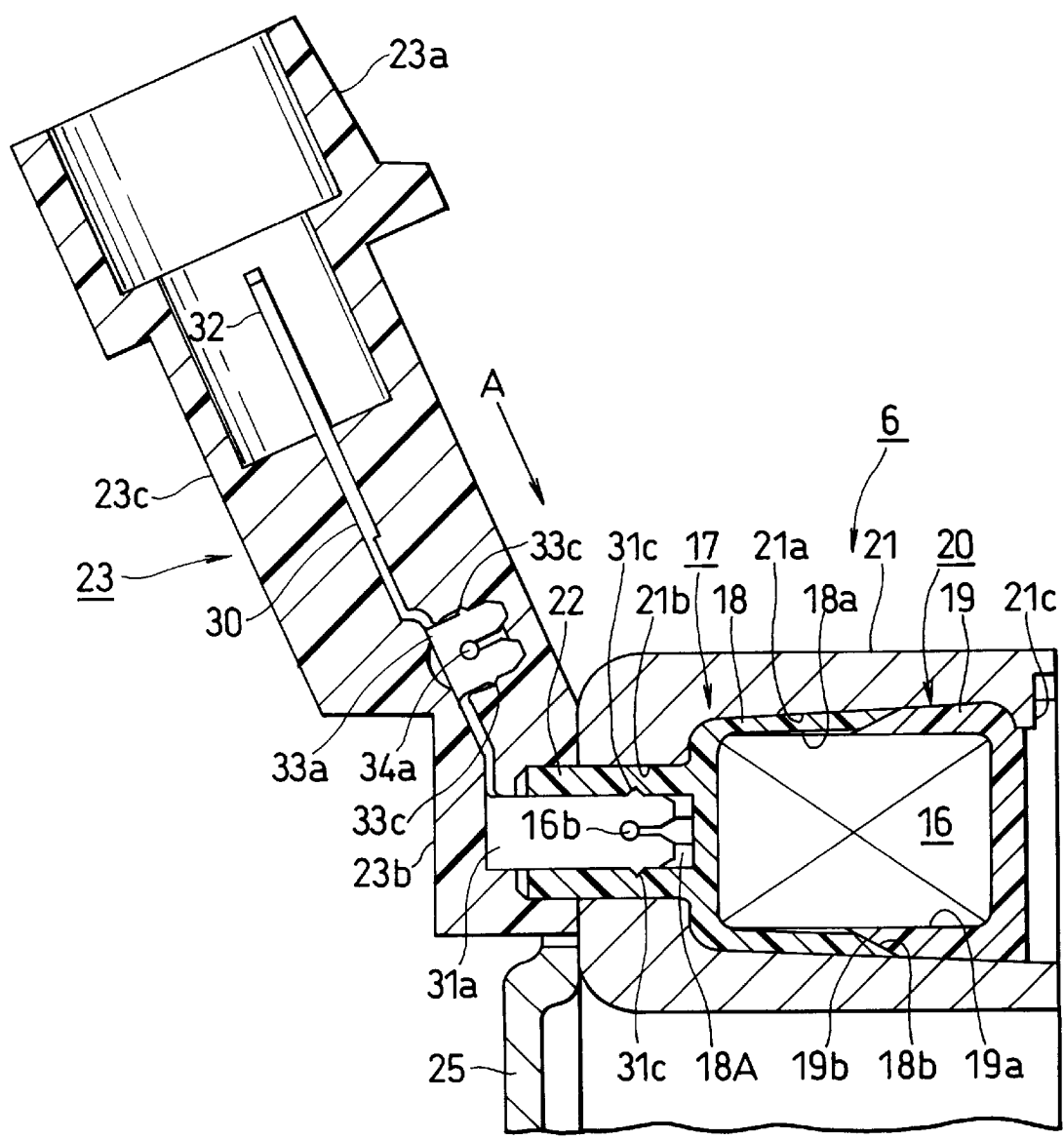
FIG. 4 is a sectional side view of an end terminal assembly as taken along a line B—B in FIG. 5.
Figure 5:
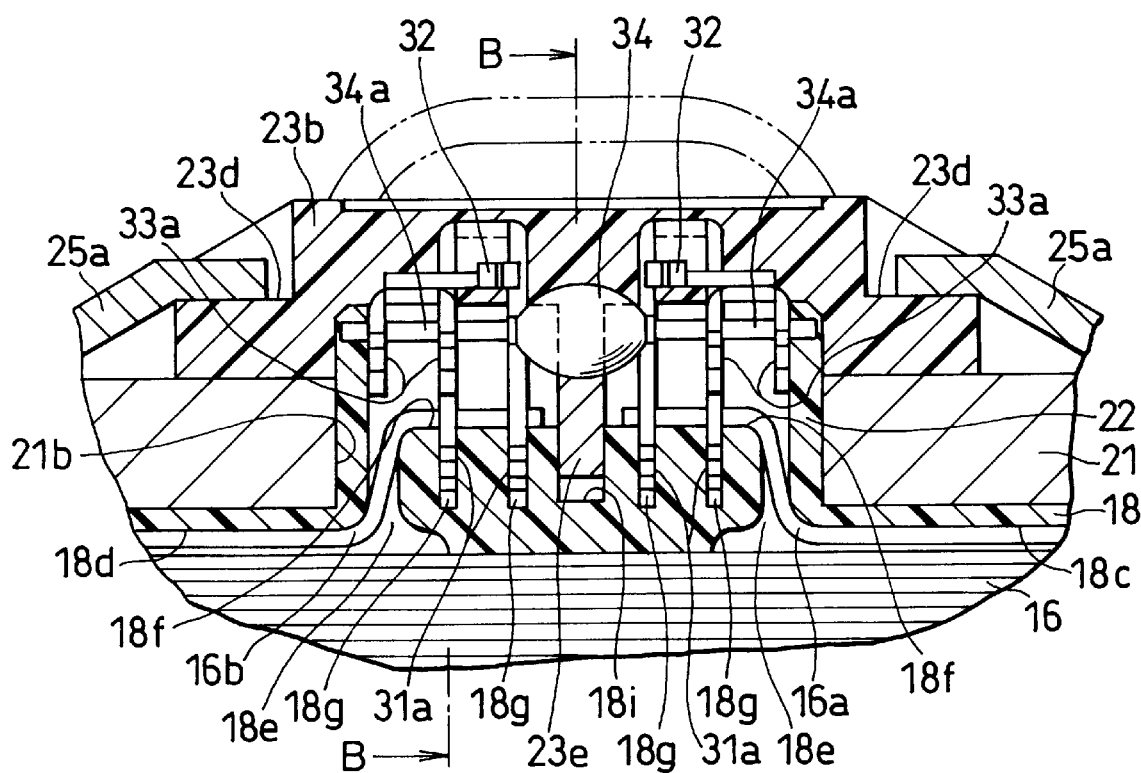
FIG. 5 is a fragmentary plan view of the end terminal assembly as seen from above obliquely, that is, in a direction A in FIG. 4.
Figure 6:
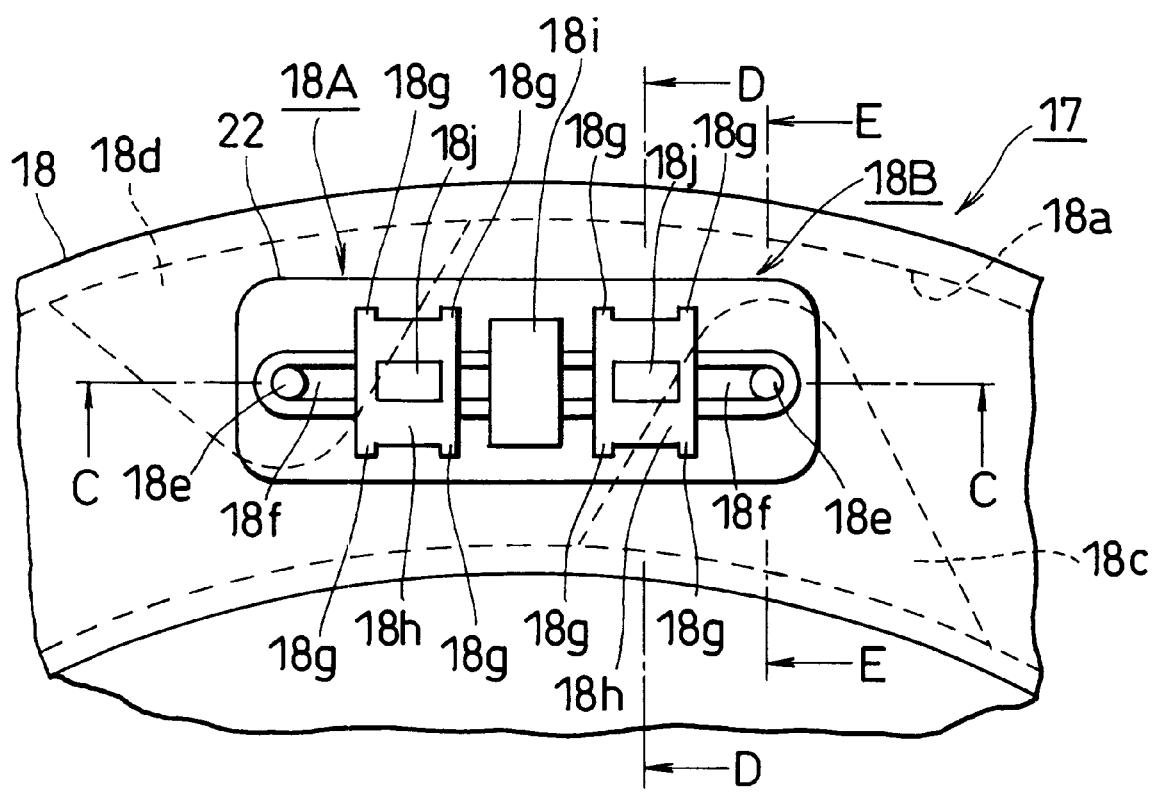
FIG. 6 is a plan view of an end terminal engagement-insertion portion as corresponds to the rear surface of a coil bobbin.
Figure 7:
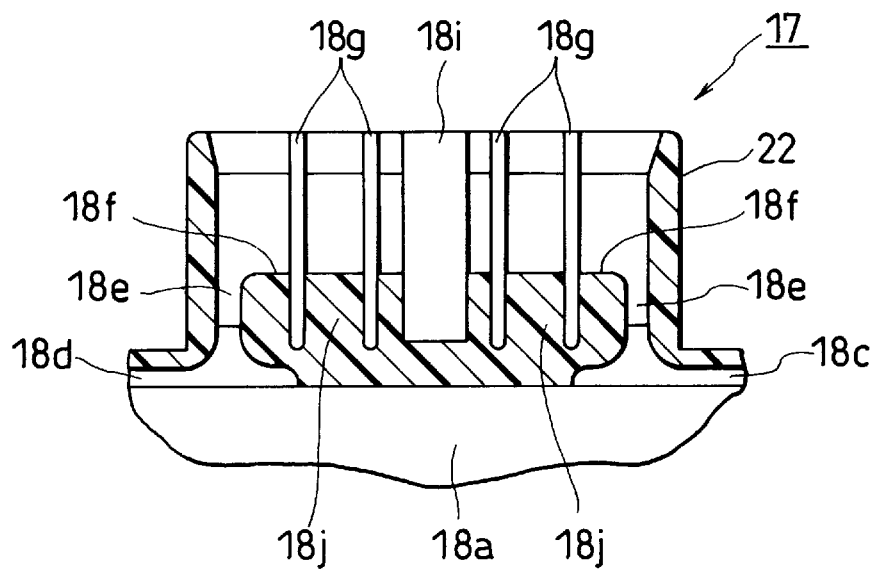
FIG. 7 is a sectional view taken along a line C–C in FIG. 6.
Figure 8A:
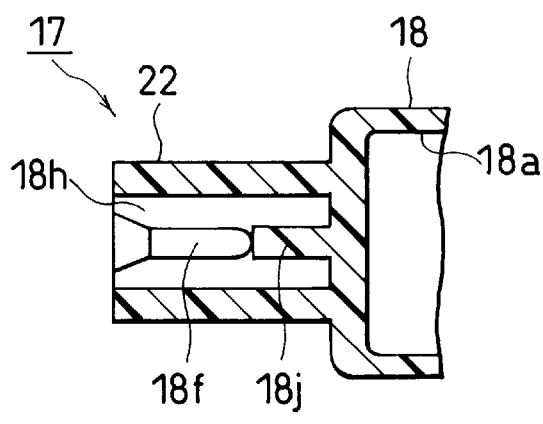
Figure 8B:
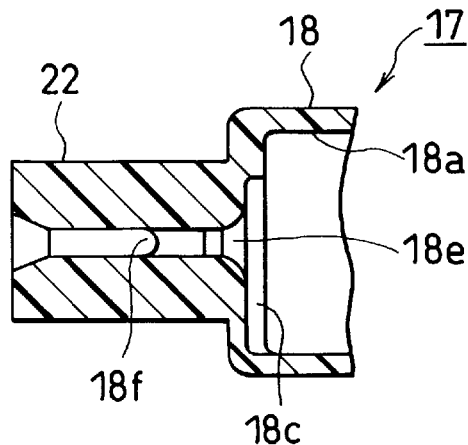
FIG. 8(b) is a sectional view thereof as taken along a line E—E in FIG. 6.

The coil assembly thus assembled is snugly fitted into the annular groove 21a of the yoke 21 while the terminal engagement-insertion portion 22 of the coil bobbin 17 is being inserted into the through hole 21b. Besides, the coil assembly is held within the yoke 21 by those plurality of caulking pieces 21c (refer to FIGS. 2 and 4) of the yoke 21 which are formed by a press work. Further, the pair of end terminals 30 of the coil side connector 23 are inserted in engagement into the terminal engagement-insertion portion 22 of the coil bobbin 17 exposed to the exterior. Likewise, the temperature fuse 27 and the intermediate terminals 28 are inserted in engagement into the terminal engagement-insertion portion 26 of the coil cover 20 exposed to the exterior.

Figure 9:
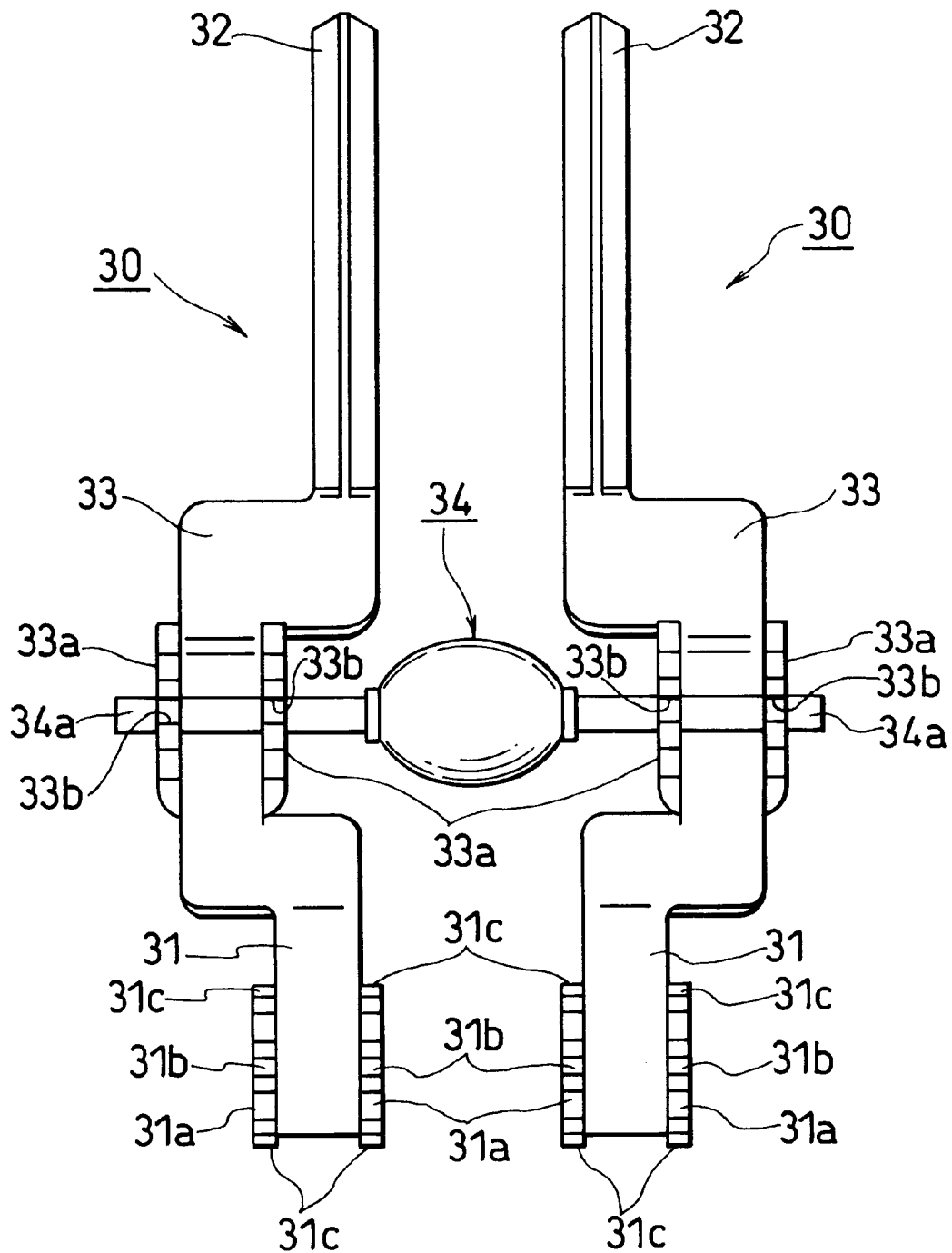
FIG. 9 is a front view of the end terminal assembly.

The coil side connector 23 has such a structure that an end terminal assembly shown in FIG. 9 is insert-molded. Each of the end terminals 30 is configured having an internal connection portion 31 which is inserted in engagement into the terminal engagement-insertion portion 22 of the coil bobbin 17 so as to be held in the corresponding one of the terminal holding portions 18A and 18B, an external connection portion 32 which is electrically connected with the terminal of a power source side connector not shown, and a mediate connection portion 33 which intervenes between the connection portions 31 and 32 and which is bent in a substantially U-shape in the direction of coming away from each end terminal 30.

The internal connection portion 31 of the end terminal 30 is formed as a U-shaped connection portion which has two side plate portions 31a opposing to each other. Both the side plate portions 31a are formed with coil engagement-insertion grooves 31b into which the initial winding end 16a or terminal winding end 16b of the exciting coil 16 is inserted in engagement so as to electrically connect the winding end 16a or 16b and the end terminal 30. Besides, the respective side plate portions 31a are formed with projection pieces 31c which bite into the terminal engagement-insertion grooves 18g of the terminal holding portion 18A or 18B provided in the terminal engagement-insertion portion 22 of the coil bobbin 17.

Likewise to the internal connection portion 31, the mediate connection portion 33 of the end terminal 30 is formed as a U-shaped connection portion which has two side plate portions 33a opposing to each other. Both the side plate portions 33a are formed with lead engagement-insertion grooves 33b into which the lead 34a of a diode 34 functioning as a surge voltage absorbing member is inserted in engagement so as to electrically connect the lead 34a and the end terminal 30. Besides, the respective side plate portions 33a are formed with projection pieces 33c (refer to FIG. 4) which bite within the terminal housing 23a of the connector 23.

The end terminal assembly formed of such a structure is embedded in the terminal housing 23a made of a synthetic resin material, at its parts except the side plate portions 31a of the internal connection portions 31 and the distal end sides of the external connection portions 32. The exterior configuration of the terminal housing 23a has a box-shaped base portion 23b which is located on the side of the internal connection portions 31 of the end terminals 30, a coupling portion 23c which is extended from the base portion 23b and whose section is elliptical, and a pair of concavities 23d which are formed outside the base portion 23b. Besides, in this embodiment, the prism-shaped guide portion 23e which is inserted into the insertion portion 18i formed in the terminal engagement-insertion portion 22 of the coil bobbin 17 is integrally formed at that inner substantially-central part of the base portion 23b at which the side plate portions 31a of the internal connection portions 31 are projected.

As regards the connector 23, the side plate portions 31a provided on the internal connection portions 31 of the end terminals 30 are inserted in engagement into the terminal engagement-insertion holes 18h of the terminal holding portions 18A and 18B provided in the terminal engagement-insertion portion 22 of the coil bobbin 17, and the guide portion 23e is inserted into the insertion portion 18i of the terminal engagement-insertion portion 22, whereby the projection pieces 33c of the side plate portions 31a bite into the terminal engagement-insertion grooves 18g of the terminal holding portions 18A and 18B. Besides, those ends 16a and 16b of the exciting coil 16 which are bent into the coil engagement-insertion grooves 18f of the terminal engagement-insertion portion 22 are inserted in engagement into the coil engagement-insertion grooves 31b of the side plate portions 31a. At this time, the respective ends 16a and 16b have their coating films torn off and are electrically connected with the end terminals 30.

Further, the base portion 23b of the terminal housing 23a is put on the open part of that terminal engagement-insertion portion 22 of the coil bobbin 17 which protrudes from the rear surface of the yoke 21. Besides, the pair of raise pieces 25a of the mounting plate 25 are bent and are individually engaged with the pair of concavities 23d which are provided in the base portion 23b of the terminal housing 23a. Therefore, the connector 23 is held at the rear of the yoke 21, and the external connection portions 32 of the end terminals 30 are oriented in the direction of coming away from the center of the coil bobbin 17. By the way, the inner side surface of the base portion 23b of the terminal housing 23a is secured to the open part of the terminal engagement-insertion portion 22 of the coil bobbin 17 so as to close up this open part. Besides, the base portion 23b is snugly fitted into the recess 2b of the front housing 2, and the coupling portion 23c is constructed outside the outer peripheral surface of the front housing 2.

Meanwhile, in the terminal engagement-insertion portion 26 of the coil cover 20, the cut ends 16c of the exciting coil 16 led out of the leading-out ports 19c are bent into the coil engagement-insertion grooves 26a, and the leads 27a of the temperature fuse 27 are inserted in engagement into the lead engagement-insertion grooves 26b. Further, the pair of intermediate terminals 28 each of which is formed in the shape of letter U and each of which has two side plate portions 28a opposing to each other are inserted in engagement into the terminal engagement-insertion grooves 26c of the terminal holding portions 26A and 26B, whereby the exciting coil 16 and the temperature fuse 27 are electrically connected in series. In each of the intermediate terminals 28, each of the side plate portions 28a is formed with engagement-insertion grooves 28b into which the cut end 16c and the lead 27a are inserted in engagement, and projection pieces 28c which bite into the terminal engagement-insertion grooves 26c of the corresponding one of the terminal holding portions 26A and 26B. The cover 29 made of a synthetic resin material is secured to the open part of the terminal engagement-insertion portion 26 so as to seal up this terminal engagement-insertion portion 26.

According to the electromagnetic clutch 1 of the structure as thus far described, the exciting coil 16 is energized through the end terminals 30 of the coil side connector 23 connected with the power source side connector, in the rotating state of the rotor 5 over which an unshown belt is passed. Then, the friction surface of the armature 12 is magnetically drawn to that of the rotor 5 by the magnetic attraction force of the generated magnetic flux. Besides, the compressor is driven. When the exciting coil 16 is de-energized, the magnetic flux is lost, and the armature 12 is separated from the rotor 5 by the resilient restoring forces of the leaf springs 10. Besides, the compressor is stopped. Incidentally, a counterelectromotive force generated at the time of the de-energization is absorbed by the diode 34. In addition, when the friction surface of the armature 12 and that of the rotor 5 have undergone a slip rotation due to the trouble of the compressor during the energization, the temperature fuse 27 blows on account of its excessive temperature rise ascribable to frictional heat, and hence, the armature 12 is separated from the rotor 5 by the leaf springs 10.

By the way, the electromagnetic clutch 1 described as the aspect of performance of this invention has the structure in which one pair of end terminals 30 are embedded in the terminal housing 23, and in which the terminal of the power source side connector connected with the minus side terminal 30 is earth-connected to the housing of the compressor through lead wire. In an electromagnetic clutch which is installed in the compressor of an air conditioning system for an automobile, however, one end of an exciting coil serving as a minus side is sometimes earth-connected to the yoke of the electromagnetic clutch.

Figure 16:
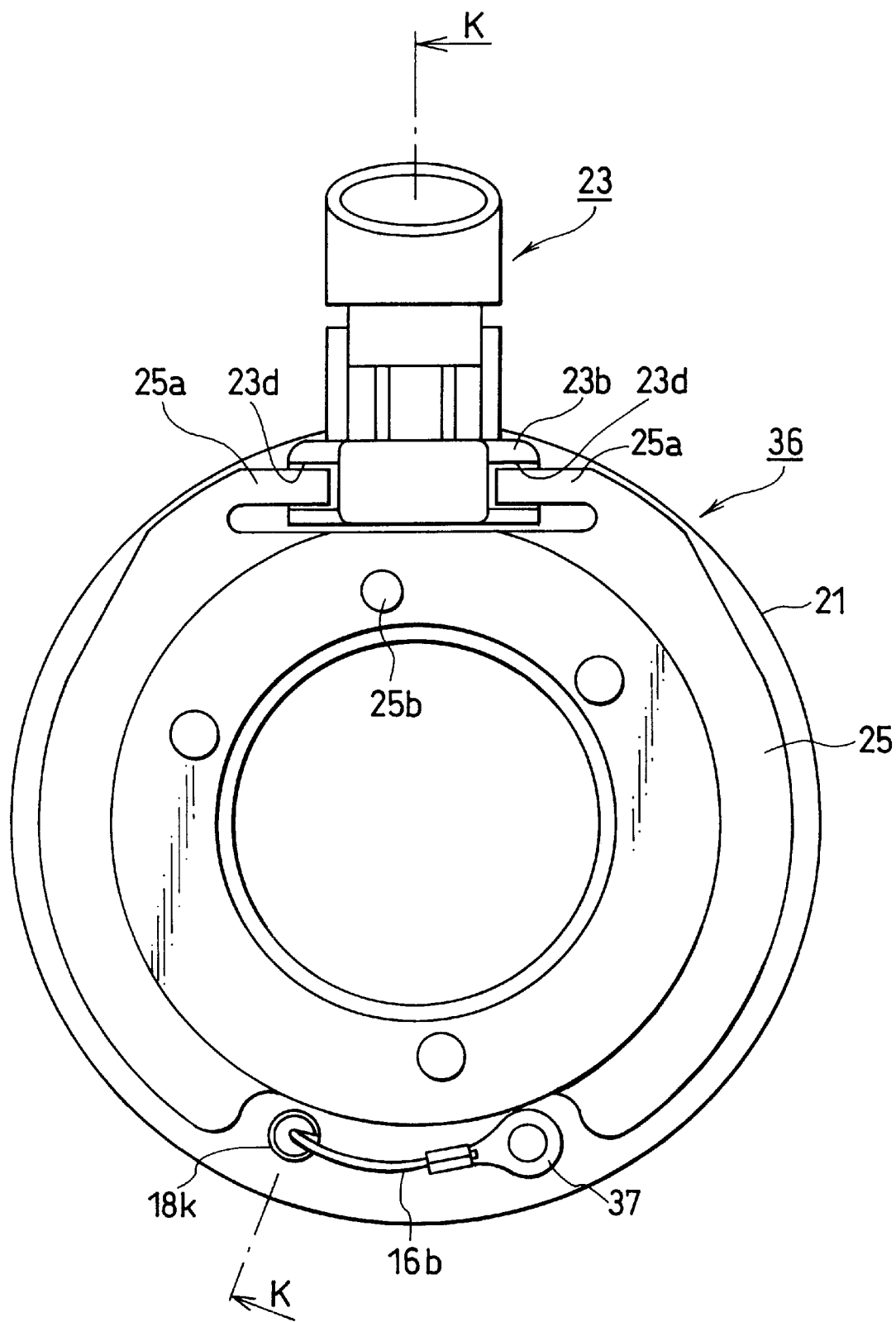
FIG. 16 is a rear view of a yoke assembly which is illustrated as another aspect of performance of this invention.
Figure 17:
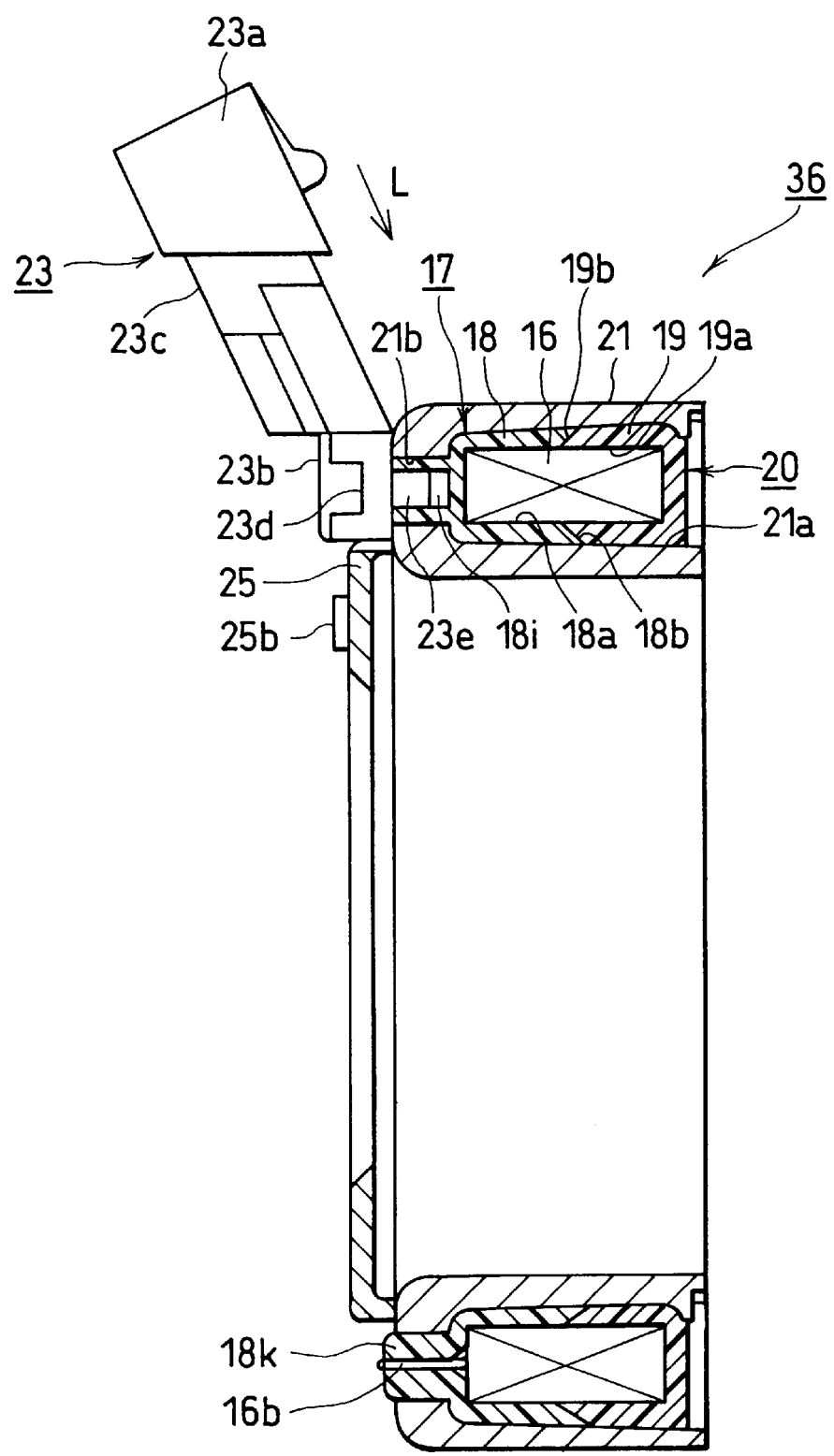
FIG. 17 is a sectional view taken along a line K—K in FIG. 16.
Figure 18:
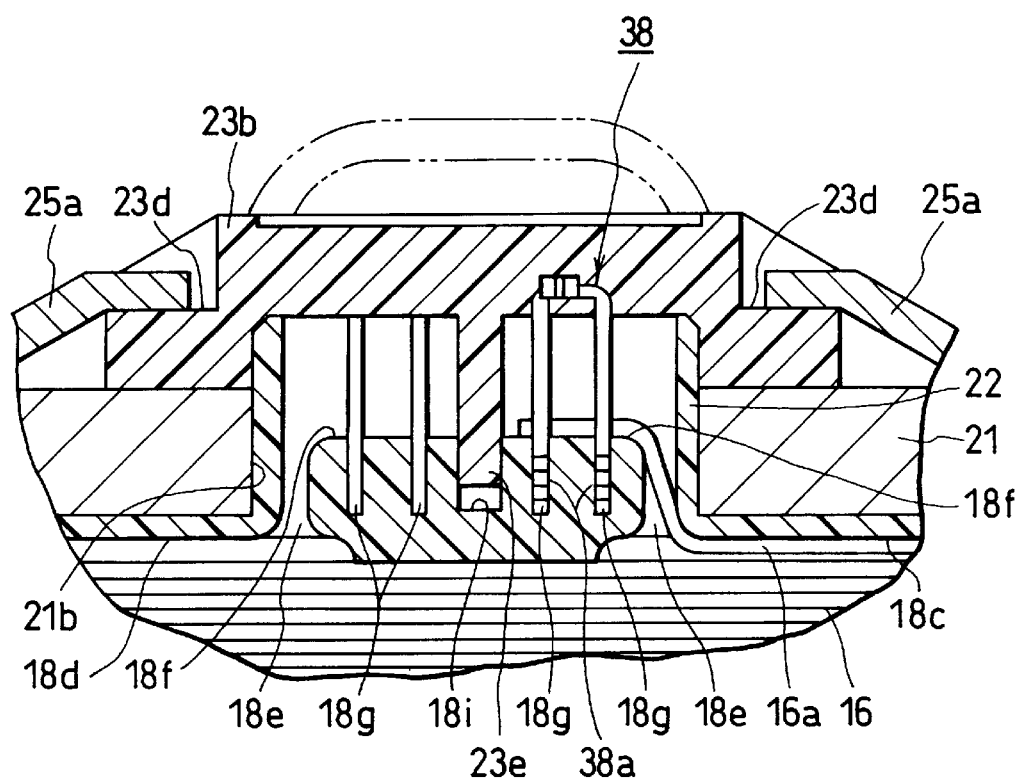
FIG. 18 is a fragmentary view of the yoke assembly seen in a direction L in FIG. 17.

In FIGS. 16 thru 18, the yoke assembly of an electromagnetic clutch in which one end of an exciting coil is earth-connected to a yoke is illustrated as an electromagnetic coupling device according to this invention. FIG. 16 is a rear view of the yoke assembly, FIG. 17 is a sectional view thereof as taken along a line K—K in FIG. 16, and FIG. 18 is a fragmentary view thereof as seen in a direction L in FIG. 17. Incidentally, constituents identical or equivalent to those of the yoke assembly 6 described before will not be repeatedly explained by indicating the already used symbols on the drawings.

Figure 10:
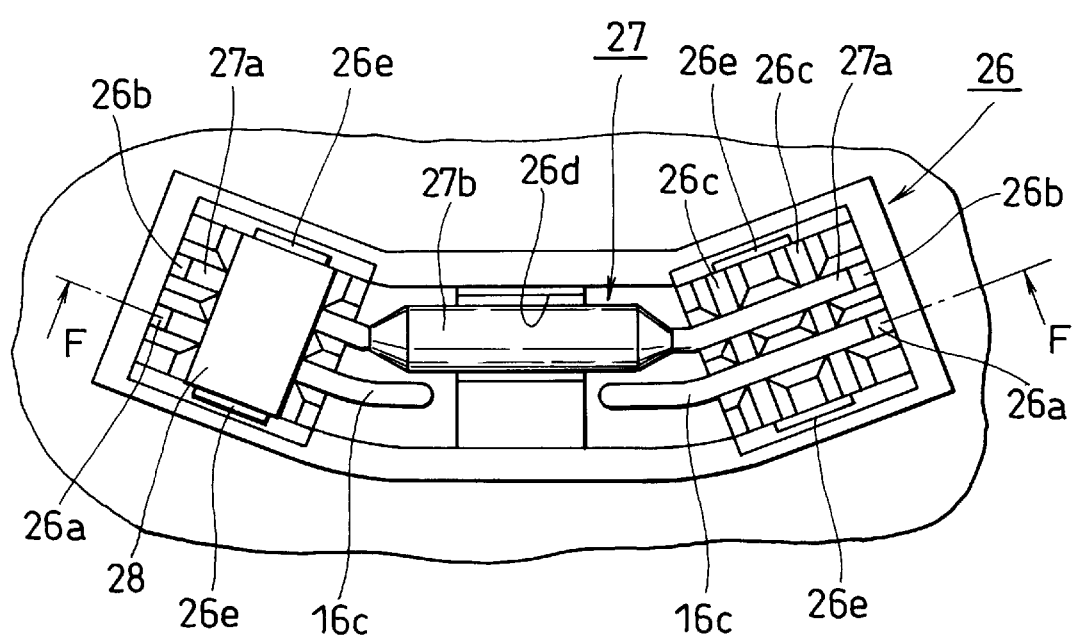
FIG. 10 is a front view of the yoke assembly showing the surroundings of the terminal engagement-insertion portion of a coil cover with a component cover and one of intermediate terminals taken off.
Figure 11:
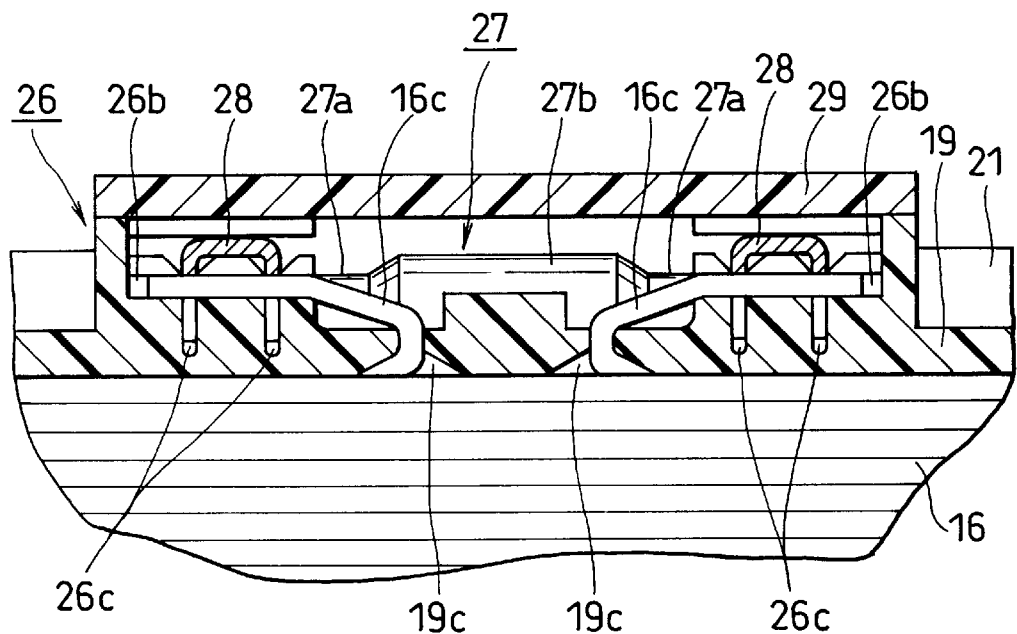
FIG. 11 is a developed sectional view taken along a line F—F in FIG. 10.
Figure 12A:
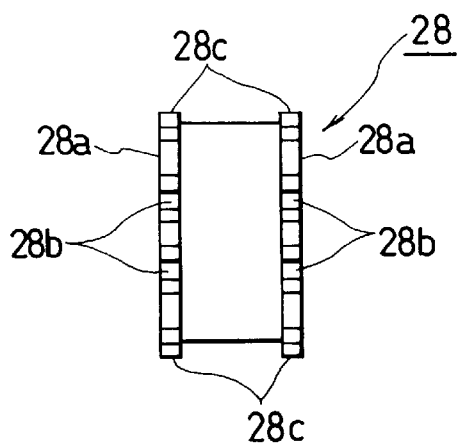
FIGS. 12(a) and 12(b) are a plan view and a side view showing the intermediate terminal, respectively.
Figure 12B:
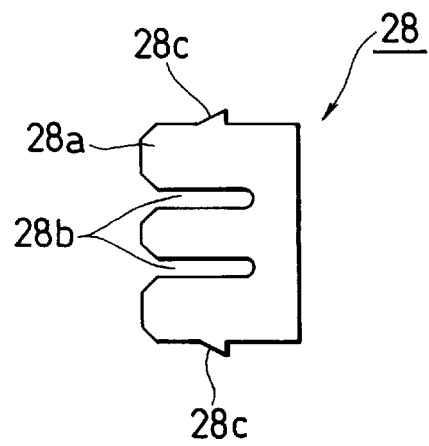

The yoke assembly 36 has a coil bobbin 17 formed with a coil leading-out portion 18k by which the end (terminal winding end) 16b of the exciting coil 16 serving as a minus side is led out. In addition, an earth terminal 37 is fixed to the end 16b of the exciting coil 16 led out of the coil leading-out portion 18k, and it is fixed to the rear surface of a yoke 21, whereby the end 16b of the exciting coil 16 is earth-connected to the yoke 21. Besides, the end (initial winding end) 16a of the exciting coil 16 on a plus side is led out into the terminal engagement-insertion portion 22 of the coil bobbin 17 and is electrically connected with the internal connection portion 38a of one end terminal 38 embedded in a terminal housing 23. Further, the prism-shaped guide portion 23e of the terminal housing 23 is inserted into an insertion portion 18i which is provided in the terminal engagement-insertion portion 22 of the coil bobbin 17, and the raise pieces 25a of a mounting plate 25 are bent and are engaged with a pair of concavities 23d which are formed outside a base portion 23b. Incidentally, the other construction including the structure in which a temperature fuse 27 is assembled in the terminal engagement-insertion portion 26 of a coil cover 20 (refer to FIG. 10), the configuration of the internal connection portion 38a of the end terminal 38, etc. are substantially the same as in the yoke assembly 6.

The electromagnetic clutch comprising such a yoke assembly 36 achieves an operation similar to that of the electromagnetic clutch 1 described before, and it is used as the power transmission device of a compressor.

In the above, the electromagnetic clutches each of which is installed on the compressor of an air conditioning system for an automobile have been described as the aspects of performance of this invention. The electromagnetic coupling device of this invention, however, is also applicable to electromagnetic clutches which are used as power transmission devices for general industries, electromagnetic brakes which are used as braking devices for the general industries, etc. Besides, the configurations of the end terminals, the intermediate terminals, the terminal housing of the connector, etc. can be altered in design without being restricted to those in the embodiments.

Thus, in one embodiment, the electromagnetic coupling device of this invention, the ends of an exciting coil and end terminals are electrically connected in the terminal engagement-insertion portion of a coil bobbin inserted into the through hole of a yoke, so that the quantity of protrusion of a terminal housing from the yoke can be made small. Accordingly, the full length dimension of a compressor on which the electromagnetic coupling device is installed can be shortened. Moreover, the end terminals and the ends of the exciting coil are electrically connected while a guide portion provided on the terminal housing is being inserted into an insertion portion formed in the terminal engagement-insertion portion of the coil bobbin, so that such a connecting operation can be reliably performed to prevent an inferior connection and the like problems on the quality of the coupling device. In addition, the minus side end of an exciting coil is earth-connected to a yoke, so that only a single lead is needed for a power source side connector, and the electromagnetic coupling device of lower cost can be offered.

A surge voltage absorbing member is embedded in a terminal housing prepared as a component, not in the terminal housing of an exciting coil formed of a casting resin, so that the surge voltage absorbing member is not damaged by heat or pressure during insert-molding. Moreover, waterproofness for the surge voltage absorbing member is excellent. An exciting coil held by a coil bobbin can be insulated from the exterior by a coil cover formed with a terminal engagement-insertion portion into which intermediate terminals are inserted in engagement, and a casting resin need not be poured into a yoke, so that the productivity of the electromagnetic coupling device is enhanced.

Each of the internal connection portion and mediate connection portion of each end terminal is provided with opposing side plate portions, and each of the side plate portions is formed with individual engagement-insertion grooves, so that the ends of an exciting coil or the leads of a surge voltage absorbing member can be readily connected to the respective connection portions. The terminal engagement-insertion portion of a coil cover is provided with terminal holding portions each of which includes a coil engagement-insertion groove, a lead engagement-insertion groove and a terminal engagement-insertion hole, and this terminal engagement-insertion portion is closed up with a cover member, so that the connection between an exciting coil and a thermosensitive member can be facilitated to enhance the productivity of the electromagnetic coupling device. Moreover, waterproofness within the terminal engagement-insertion portion is excellent.

Each of intermediate terminals is provided with opposing side plate portions, and the side plate portions are individually formed with engagement-insertion grooves, so that the cut ends of an exciting coil and the leads of a thermosensitive member can be readily connected.

Those skilled in the art to which the invention pertains may make modifications and other embodiments employing the principles of this invention without departing from its spirit or essential characteristics particularly upon considering the foregoing teachings. The described embodiments are to be considered in all respects only as illustrative and not restrictive and the scope of the invention is, therefore, indicated by the appended claims rather than by the foregoing description Consequently, while the invention has been described with reference to particular embodiments, modifications of structure, sequence, materials and the like would be apparent to those skilled in the art, yet still fall within the scope of the invention.

What is claimed is:

1. An electromagnetic coupling device having a terminal housing held by a yoke, comprising:

an exciting coil; a coil bobbin including a coil holding portion forming a central axis in which said exciting coil is held, and a first terminal engagement-insertion portion by which ends of said exciting coil are led out; said yoke including an annular groove in which said coil holding portion is snugly fitted, and a through hole into which said first terminal engagement-insertion portion is inserted;

two end terminals which are electrically connected to the respective ends of said exciting coil;

and said terminal housing in which said end terminals are embedded and which is held by said yoke;

said first terminal engagement-insertion portion including two terminal holding portions each of which is formed with a coil engagement-insertion groove for inserting the corresponding end of said exciting coil in engagement thereinto, and a terminal engagement-insertion hole for inserting a corresponding one of internal connection portions of said end terminals in engagement thereinto, and an insertion portion into which a protruding guide portion of said terminal housing is inserted along said coil holding portion central axis.

2. An electromagnetic coupling device as defined in claim 1, comprising a coil cover which is put on said exciting coil held by said coil bobbin, said coil cover including a second terminal engagement-insertion portion into which two intermediate terminals for electrically connecting cut ends of said exciting coil and leads of a thermosensitive member are inserted in engagement.

3. An electromagnetic coupling device as defined in claim 2, wherein said second terminal engagement-insertion portion of said coil cover includes two terminal holding portions each being formed with a coil engagement-insertion groove into which the corresponding cut end of said exciting coil is inserted in engagement, a lead engagement-insertion groove into which the corresponding lead of said thermosensitive member is inserted in engagement, and a terminal engagement-insertion hole into which the corresponding intermediate terminal is inserted in engagement, and wherein said second terminal engagement-insertion portion is sealed up with a cover member.

4. An electromagnetic coupling device as defined in claim 3, wherein said each intermediate terminal is formed into a U-shape, and each of opposing side plate portions thereof is formed with two individual engagement-insertion grooves.

5. An electromagnetic coupling device as defined in claim 1, wherein a surge voltage absorbing member which is electrically connected between said end terminals is embedded in said terminal housing.

6. An electromagnetic coupling device as defined in claim 5, wherein said each end terminal includes an internal connection portion to which the corresponding end of said exciting coil is connected, and a mediate connection portion to which a corresponding one of leads of said surge voltage absorbing member is connected, and wherein each of the internal and mediate connection portions is formed into a U-shape, and opposing side plate portions thereof are individually formed with engagement-insertion grooves.

7. An electromagnetic coupling device having a terminal housing held by a yoke, comprising: an exciting coil; a coil bobbin including a coil holding portion forming a central axis in which said exciting coil is held, and a first terminal engagement-insertion portion by which one of ends of said exciting coil is led out; said yoke including an annular groove in which said coil holding portion is snugly fitted, and a through hole into which said first terminal engagement-insertion portion is inserted; an end terminal which is electrically connected to the corresponding end of said exciting coil; and said terminal housing in which said end terminal is embedded and which is held by said yoke; said first terminal engagement-insertion portion including a terminal holding portion which is formed with a coil engagement-insertion groove for inserting said corresponding end of said exciting coil in engagement thereinto, and a terminal engagement-insertion hole for inserting an internal connection portion of said end terminal in engagement thereinto, and an insertion portion into which a protruding guide portion of said terminal housing is inserted along said coil holding portion central axis; the other end of said exciting coil being earth-connected to said yoke.

8. An electromagnetic coupling device as defined in claim 7, wherein said coil bobbin includes a coil leading-out portion by which said other end of said exciting coil is led out of said coil holding portion, said yoke includes a through hole into which said coil leading-out portion is inserted, and said other end of said exciting coil is led out to the exterior of said yoke.

9. An electromagnetic coupling device as defined in claim 7, comprising a coil cover which is put on said exciting coil held by said coil bobbin, said coil cover including a second terminal engagement-insertion portion into which intermediate terminals for electrically connecting cut ends of said exciting coil and leads of a thermosensitive member are inserted in engagement.

10. An electromagnetic coupling device as defined in claim 9, wherein said second terminal engagement-insertion portion of said coil cover includes two terminal holding portion each being formed with a coil engagement-insertion groove into which the corresponding cut end of said exciting coil is inserted in engagement, a lead engagement-insertion groove into which the corresponding lead of said thermosensitive member is inserted in engagement, and a terminal engagement-insertion hole into which the corresponding intermediate terminal is inserted in engagement, and wherein said second terminal engagement-insertion portion is sealed up with a cover member.

11. An electromagnetic coupling device as defined in claim 10, wherein said each intermediate terminal is formed into a U-shape, and each of opposing side plate portions thereof is formed with two individual engagement-insertion grooves.

* * * * *